Patented July 31, 1945

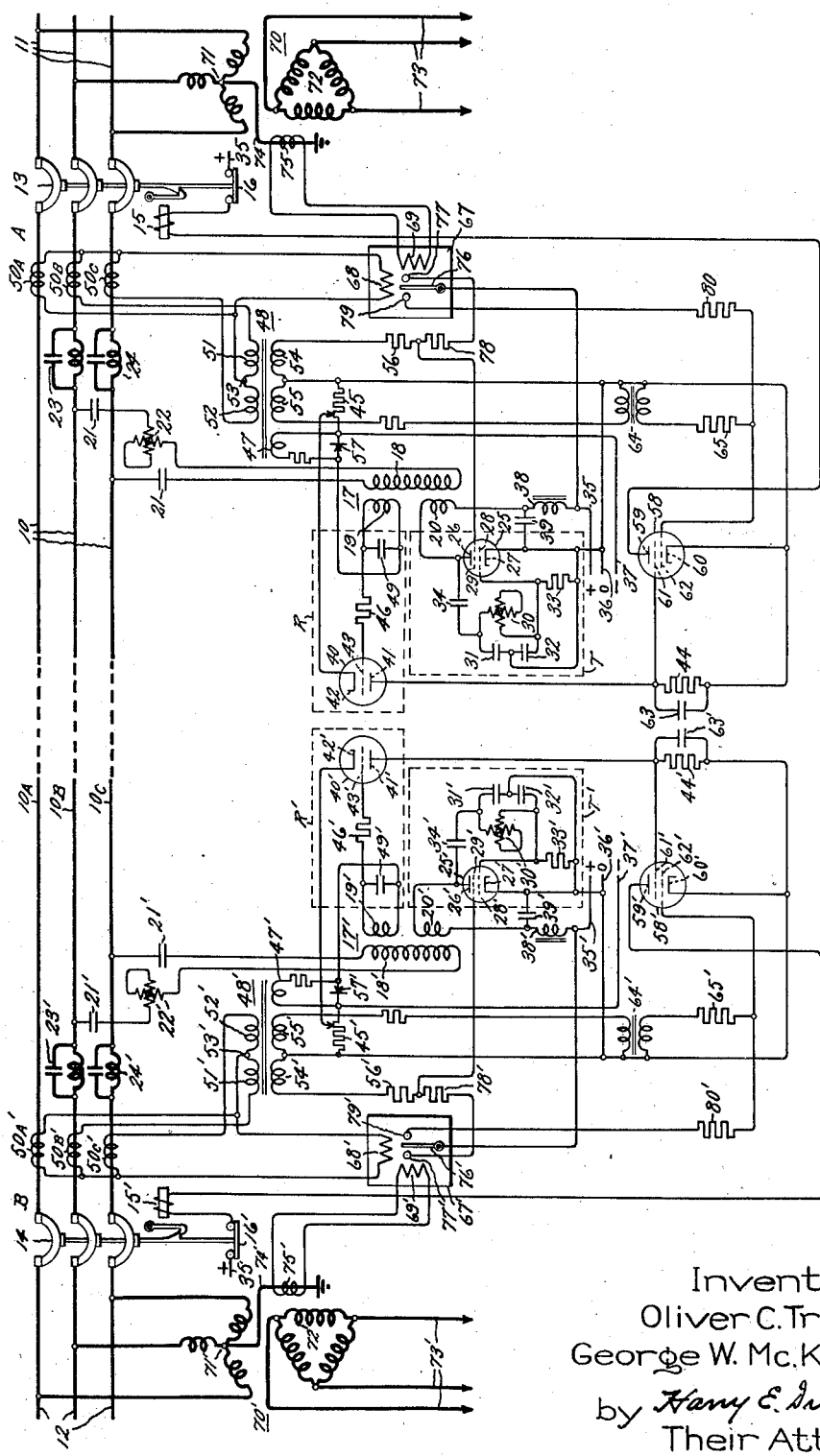
Inventors:
Oliver C. Traver,
George W. McKenna,
by Harry E. Dunham
Their Attorney.

2,380,805

UNITED STATES PATENT OFFICE 2,380,805

PROTECTIVE SYSTEM

Oliver C. Traver, Drexel Hill, and George W. McKenna, Philadelphia, Pa., assignors to General Electric Company, a corporation of New York Application August 19, 1942, Serial No. 455,326

24 Claims. (Cl. 175—294)

Our invention relates to protective systems and more particularly to a protective system wherein a discriminating action is obtained by comparison of electric characteristics of a circuit being protected at different points thereon so that, on the occurrence of abnormal current conditions, faulty sections of said circuit may be eliminated without impairing continuity of service on the sound sections. Specifically, our invention is an improvement on Reissue Patent 19,034, granted December 26, 1933, upon an application of A. S. FitzGerald.

Protective systems for electric circuits and apparatus wherein a comparison of electric characteristics of the protected circuit at two different points thereon have been used quite extensively. One form of such a protective system is the so-called "pilot wire" protective system in which a comparison between quantities at two ends of the protected circuit are made through the medium of a pilot wire. A modification of the pilot wire protective system is the so-called "carrier-current protective system" in which no separate pilot wires are required but relaying information is transmitted directly over the circuit being protected.

In most of the carrier-current protective systems used heretofore, difficulties of one form or another were encountered and it has been necessary to sacrifice certain desirable operating characteristics in order to get certain essential characteristics. Furthermore, most of these prior systems have been unduly complicated when incorporating all the desirable features of a modern carrier-current protective system. Such carrier-current protective systems should first of all only cause isolation of a minimum section of an electric system when a fault actually exists on such a section. In other words, it is essential that no false operation occurs. Since asynchronous conditions of transmission lines, such as out-of-step conditions, for example, often affect the protective relays like an actual fault condition, very complicated and elaborate means were required in most carrier-current protective systems used to any extent heretofore in order to eliminate false tripping and isolation on such asynchronous conditions. Furthermore, in many of these systems, the out-of-step blocking schemes which were necessary to prevent such false operation would render the protective system ineffective to give protection against faults which might occur during such out-of-stop conditions.

In accordance with the FitzGerald reissue patent referred to above, the carrier-current transmitters and receivers at the relaying stations at each end of the line section being protected are rendered operative and inoperative according to the instantaneous polarity of the alternating current flowing in this line section at the relaying stations and, consequently, transmission and reception of carrier-frequency current can occur only during alternate half cycles. By arranging this periodic control of the transmitters and receivers under external fault conditions so that the transmitter at one station is operating during the same half cycle that the receiver at the remote station is receptive and also by arranging the circuit so that the transmitter and receiver at any particular station are not operative at the same time, both the transmitters and both the receivers may operate on a single frequency.

Under internal fault conditions with the above arrangement, the power-frequency current flowing at one of the terminals of the protected line section reverses so that the directions of flow of power-frequency current at the two terminals of the line section are opposite. Consequently, on an internal fault condition with the periodic operation of the transmitters and receivers mentioned above and for a particular half cycle of power-frequency current, the transmitters at each end of the protected line section are simultaneously operative but no receivers are operative to receive the signal. Similarly, during alternate half cycles when the receivers are operative, neither of the transmitters are sending out carrier-frequency current. In other words, during an external fault condition with respect to the protected section of the electric circuit, there is an oscillating exchange of carrier-current relaying information between the ends of the section but, during an internal fault, this exchange does not occur since neither relaying station transmits a signal of carrier frequency when the other terminal is capable of receiving this signal. Consequently, by using the carrier-frequency current transmission and reception as indicative of an external fault, circuit-interrupting devices for isolating a protected section may be permitted to operate when no carrier signal is transmitted by one station and received by the other but be blocked from operation when such carrier transmission and reception occurs or when there is an exchange of carrier-current relaying information between terminals.

Since system oscillations or out-of-step conditions on the circuit or line section being protected do not cause a reversal of the power currents at one end of the section relative to the other, an inherent out-of-step blocking action is provided and no additional complicated equipment is required in the FitzGerald type of carrier-current protective system as in other prior art arrangements. Our invention utilizes this inherent advantage of the FitzGerald protective system.

Accordingly, it is an object of our invention to provide a new and improved protective system which is simple and compact, which is entirely free from false operation on out-of-step or other asynchronous conditions on the system being protected and, furthermore, which gives complete protection against faults which might occur during such out-of-step or asynchronous conditions.

It is another object of our invention to provide a new and improved multi-phase fault protective system in which no potential transformers of any kind are required and in which accurate operation on both ground faults and phase faults is realized.

Still another object of our invention is to provide a carrier-current protective system for both ground-fault and phase-fault protection which not only gives ground fault preference but in which a superposition of ground-fault and phase-fault control is provided with no delay between operation of either one or the other.

It is another object of our invention to provide an improved protective system of the type disclosed in the above-mentioned FitzGerald reissue patent which eliminates the expense of costly devices, such as pilot wires, phase directional relays, and potential transformers.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawing in which the single figure thereof is a diagrammatic representation of a carrier-current protective system of the FitzGerald type embodying our invention.

Referring now to the drawing, there is illustrated a section of a polyphase electric circuit designated as line section 10 shown partly in broken lines to give a conception of distance and extending between two adjacent line sections 11 and 12. Suitable circuit-interrupting means, generally indicated at 13 and 14, are provided to isolate line section 10, which has been illustrated as forming a portion of a three-phase alternating-current circuit, from adjacent line sections 11 and 12. Circuit-interrupting means 13 and 14 have been illustrated as latched-closed circuit breakers, the circuit breaker 13 being provided with a trip coil 15 and an $a$ switch 16 which is closed when the circuit breaker is closed and open when the circuit breaker is open. Similarly, the circuit breaker 14 is provided with a trip coil 15' and an $a$ switch 16'.

The circuit breakers 13 and 14 are arranged to be controlled in accordance with our invention by a discriminating action dependent upon the instantaneous directions of the currents at two relaying stations or points, such as the ends A and B of the polyphase line section 10.

Although our invention is applicable to either a pilot wire or carrier-current protective system, we have chosen for purposes of illustration and description to disclose our invention as applied to a carrier-current protective system in which the line section 10 comprising phase conductors 10A, 10B, and 10C provides the channel for communicating a control signal from station A to station B or vice versa.

Since the protective apparatus at each end of line section 10 is identical, that apparatus at relaying point or station A will be described hereinafter and the corresponding apparatus at relaying station B will be designated by the same reference numerals marked with a prime. Accordingly, at station A, there is provided a carrier-frequency transmitter generally indicated as T and a carrier-frequency receiver generally indicated as R. The receiver R at station A is tuned to the frequency of the transmitter T' at station B and, although different frequencies can be used, both the transmitters T and T' may preferably be operated at the same frequency and the receivers R and R' be tuned accordingly. Preferably, the receiver R and the transmitter T are coupled to line section 10 through a coupling transformer 17 including windings 18, 19 and 20, respectively, the windings 19 and 20 being inductively coupled with the winding 18. Although the carrier-current channel through line section 10 may comprise a single-phase conductor with ground return, such as is indicated in Fig. 4 of the above-mentioned reissue patent, we have chosen to utilize for the carrier-current channel phase conductors 10B and 10C of line section 10 to which winding 18 of transformer 17 is connected through coupling capacitors 21 and variable inductance 22. The variable inductance means 22 and the capacitors 21 provide the tuned coupling capacitor means by which the receiver R and transmitter T are connected to phase conductors 10B and 10C.

Since line section 10 forms only a portion of the sectionalized polyphase alternating-current circuit or system being protected so as to permit isolation of a minimum portion thereof in case of a fault thereon and similar protective schemes are provided for the sections, such as 11, to the right of circuit breaker 13 and the sections, such as 12, to the left of the circuit breaker 14, it is necessary to provide means for controlling the path of the carrier-frequency current so as substantially to confine this current to line section 10. Also means must be provided to prevent external faults from draining the carrier current or short-circuiting it thereby preventing its blocking action. Accordingly, phase conductors 10B and 10C are provided at each end thereof with carrier-frequency current traps, generally indicated at 23 and 24 at station A and 23' and 24' at station B, respectively. These traps preferably comprise a parallel connected reactance and capacitance tuned substantially to the frequency of the carrier current so as to afford a high impedance to the carrier-frequency current flowing in line section 10 but do not present any appreciable impedance to currents of power frequencies of the order of sixty cycles. The ideal traps would, of course, pass all power currents and stop entirely all carrier-frequency currents at the frequency to which they are tuned. While this ideal is theoretically possible, it is not necessary for satisfactory operation of our invention, it merely being essential that the trap affords a low impedance to currents of power frequency and a very high impedance to carrier-frequency currents.

The transmitter T, which has a load or output circuit including the winding 20 inductively coupled to winding 18 of the coupling transformer 17, may comprise any customary form of oscillation generator. In the drawing, we have illustrated transmitter T as comprising the well known Colpitts oscillator including an electric discharge valve 25 having an anode or plate 26, a cathode 27, and control electrodes or grids 28 and 29, the latter acting as a screen grid. The oscillating action of discharge valve 25 is controlled by a tuned or resonant circuit comprising inductance 30 connected in parallel with serially arranged capacitors 31 and 32. The cathode 27 of discharge valve 25 is connected to a point on the tuned circuit between capacitors 31 and 32 which act as a voltage divider. The lower terminal of the tuned circuit is connected to control electrode 28 and a grid-leak resistance 33 is connected between control electrode 28 and cathode 27. The upper terminal of the tuned circuit is connected to anode 26 through blocking condenser 34 in order to insulate the anode 26 from control electrode 28 in so far as the direct-current potential applied to the anode-cathode circuit of electric discharge valve 25, to be described hereinafter, is concerned while still maintaining anode 26 and the upper terminal of the tuned circuit at the same carrier frequency potential.

A source of direct-current potential is applied across the anode-cathode circuit as mentioned above. Preferably, this source comprises a three-wire direct-current source having a positive terminal 35, a neutral or ground terminal 36 and a negative terminal 37. The positive terminal 35 is connected to the anode 26 through a choke coil 38 while the neutral terminal 36 of the direct-current source is connected to the cathode 27. In order to complete a load circuit for the high-frequency oscillations produced by the transmitter T, independently of choke coil 38, which would afford a high impedance to such oscillations, we connect a by-passing capacitor 39 across the choke coil 38 and the direct current source 35 and 36. The high-frequency oscillations produced in the anode circuit of electric discharge valve 25 appear as a carrier-frequency current in the winding 20 of transformer 17 and, consequently, also in the carrier channel. It should be understood that transmitter T may, if desired, be equipped with an amplifier in a manner well known to those skilled in the art for increasing the output thereof but, as the showing of such an amplifier would complicate the drawings, it has been omitted for the sake of clearness.

The receiver R may comprise any conventional electronic receiver including an electric discharge valve, such as 40, having an anode 41, a cathode 42, and a grid or control electrode 43. The anode-cathode circuit of electric discharge valve 40 of receiver R is preferably supplied from a direct-current source. As illustrated in the drawing, the anode 41 may be connected through a suitable anode load resistance 44, the function of which will be described in greater detail hereinafter, to the neutral or ground terminal 36 of the three-wire direct-current source of potential while the cathode 42 is connected to an intermediate point on a voltage-dividing resistor 45 which, in turn, is connected across the neutral and negative terminals 36 and 37 respectively of the three-wire direct-current source. The electric discharge valve 40 associated with receiver R operates, as will be understood by those skilled in the art, both as a detector and an amplifier. To this end, control electrode 43 is connected to the negative terminal 37 of the direct-current source through current-limiting resistor 46, winding 19 of coupling transformer 17, and a winding 47 of a mixing transformer 48 to be described in greater detail hereinafter. With the direct-current connections to the cathode 42 and control electrode 43 of receiver discharge valve 40 described above, the cathode is maintained slightly more positive than the control electrode so that, if no carrier-frequency current is flowing in winding 18 of coupling transformer 17, no current will flow in the plate or anode circuit of discharge valve 40. A capacitor 49 is connected across winding 19 of coupling transformer 17. Capacitor 49 and winding 19 are tuned to resonance at the carrier-frequency current. Whenever carrier-frequency current flows in winding 19 of coupling transformer 17, a carrier-frequency potential is superimposed on the negative direct-current potential impressed on control electrode 43 which will tend to render electric discharge valve 40 conductive during alternate half cycles of the superimposed carrier frequency current as long as the potential across winding 47 does not countermand this effect. It should be understood that additional amplification means may be provided for receiver R, if desired.

In order to render the transmitters and receivers at the relaying stations A and B at each end of line section 10 operative and inoperative according to the instantaneous polarity of the alternating-current flowing in line section 10 at the relaying points, we provide a plurality of current transformers at each relaying station which at relaying station A include secondary windings 50 specifically designated as 50A, 50B, and 50C connected in star or Y relationship. These current transformers are associated with the phase conductors of line section 10 having the same subscripts 10A, 10B, and 10C, respectively. In order to obtain a single-phase relaying quantity which is proportional to the current flowing in polyphase line section 10 at station A, a mixing transformer 48 is provided having a pair of primary windings 51 and 52, each having a common terminal 53. The other terminals of windings 51 and 52 are connected to one terminal of the secondary windings 50B and 50C, respectively, of the current transformers associated with line section 10 at relaying station A. The corresponding terminal of the secondary winding 50A of the current transformer associated with phase conductor 10A is connected to terminal 53 which is also connected to the neutral terminal of the secondary windings 50A, 50B, and 50C which are connected in Y relationship as referred to above. For all faults involving more than one conductor, a single-phase relaying quantity will be obtained in each of the plurality of secondary windings 47, 54, and 55 of mixing transformer 48. The important consideration in connection with mixing transformers 48 and 48' is that, when the same currents enter line section 10 at one end and leave at the other, similar single-phase relaying potentials both with respect to phase and magnitude will be obtained across the secondary windings of these mixing transformers in so far as the corresponding windings at each end thereof are concerned. It is not important as to whether the output of mixing transformers 48 and 48' indicate the exact direction of power flow at each end of line section 10 so long as they are consistent in indicating changes in direction of this quantity.

As was mentioned above, the secondary winding 47 of mixing transformer 48 produces a power-frequency voltage which renders receiver R ineffective during alternate half cycles of the power frequency or, in other words, during successive half cycles of the same polarity.

In accordance with the disclosure in the Fitz Gerald reissue patent, it will be desirable for the transmitter T to be rendered effective to transmit carrier-frequency current when the receiver R is incapable of receiving carrier-frequency current and, to this end, secondary winding 54 of mixing transformer 48 is connected across the screen grid 29 and cathode 27 of electric discharge valve 25 through a current-limiting resistor 56. The potential of winding 54 is of opposite polarity to the potential across winding 47 so that, during one half cycle of power frequency, the receiver R is effective to receive and the transmitter T is ineffective to transmit carrier-frequency current while, during the succeeding alternate half cycle, the receiver is incapable of receiving carrier frequency but the transmitter T is operative. Windings 47 and 54 are preferably insulted from one another to avoid any interference with respect to the direct-current potentials applied thereto from terminals 36 and 37 of the direct-current source. In order to prevent the power frequency potential across winding 47 during the half cycle when electric discharge valve 40 may become conductive from having any effect on the conductivity of valve 40, we provide a unilateral conducting device 57 connected across winding 47 which short circuits this half cycle of power frequency potential.

The circuit breaker 13 at station A is controlled by an electroresponsive device which may comprise a receiver relay but which we have illustrated as comprising a tripping electroresponsive device or an electric discharge valve of the gas-filled type, generally indicated at 58, comprising an anode 59, a cathode 60, a carrier-blocking control electrode or restraining grid 61, and a tripping electrode or grid 62. The anode 59 of electric discharge valve 58 is connected to positive terminal 35 of the direct-current potential source through trip coil 15 and a switch 16 of circuit breaker 13. The cathode 60, on the other hand, is connected directly to the ground or neutral terminal 36 of the three-wire direct-current source so that, whenever electric discharge valve 58 is rendered conductive, the trip coil 15 will be energized to cause opening of the circuit breaker 13 and the consequent opening of a switch 16 will interrupt the current flowing through discharge valve 58.

As was described above, the oscillating exchange of carrier-frequency relaying information between stations A and B indicates an external fault so that, whenever receiver R receives carrier, it is essential to block tripping operation of circuit breaker 13 and, consequently, to prevent electric discharge valve 58 from being rendered conductive. Accordingly, carrier-blocking or restraining grid 61 is connected to anode 41 of receiver discharge valve 40 as well as to one terminal of anode load resistor 44. When receiver discharge valve 40 is non-conducting, no current flows through resistance 44 and, consequently, blocking or restraining grid 61 is at the same potential as cathode 60. Whenever receiver R is receiving current at carrier frequency, current flows through anode load resistance 44, causing a potential drop across this resistance which biases restraining grid 61 negative with respect to cathode 60, thereby preventing electric discharge valve 58 from conducting tripping current. A suitable capacitor 63 is connected across anode load resistance 44 in order to smooth the pulsations at carrier frequency of current flowing through receiver discharge valve 40. Furthermore, capacitor 63 will tend to act as a carrier-continuing device if for any reason short discontinuities should occur in the transmission or reception of carrier-frequency current.

Tripping electroresponsive device or electric discharge valve 58 is rendered conductive when the potential of blocking grid 61 is the same as that of cathode 60 and a positive potential is applied to tripping control electrode 62. Such a tripping potential may be obtained from winding 55 of mixing transformer 48 and may be applied across tripping electrode 62 and cathode 60 through a peaking transformer 64. A direct-current potential is also superimposed on tripping electrode 62 which is illustrated as connected through current-limiting resistor 65 to the neutral terminal 36 of the direct-current source. The reason for the peaking transformer 64 is to narrow the effective wave shape of the potential applied to tripping electrode 62 so that any carrier-blocking potential applied to restraining grid 61 of tripping electroresponsive device 58 will be sure to blanket the peaked potential and prevent operation during the entire half cycle. The polarity of the potentials across windings 47 and 55 is the same so that receiver relay R may be receptive during the half cycle when tripping electroresponsive device 58 may be rendered conductive through the application of potential to tripping control electrode 62.

The arrangement described thus far is quite similar to the FitzGerald protective system disclosed in the above-mentioned reissue patent in so far as operation on phase faults or faults involving more than one conductor is concerned. In the present arrangement, the receivers and transmitters are ready to operate whenever the output of mixing transformers 48 is sufficient to indicate a phase fault on the system with which line section 10 is associated. It will be understood by those skilled in the art that overcurrent relays may be provided such as are disclosed in the above-mentioned FitzGerald reissue patent which render the transmitters and receivers at stations A and B ineffective until currents of fault magnitude are present in line section 10 at stations A and B. Currents of fault magnitude will cause mixing transformers 48 to have an output which will tend to render transmitter T operative to transmit current of carrier frequency during one half cycle and to render receiver R receptive during alternate half cycles when the transmitter T is non-operative. Whenever the receiver R is capable of receiving current of carrier frequency, tripping electroresponsive device 58 is capable of being rendered conductive if no blocking potential applied to blocking grid 61 which occurs only if receiver R receives current of carrier frequency indicating an external fault.

In order to provide protection against ground faults on line section 10 and to prevent operation on external ground faults, we provide a ground-fault protective arrangement which not only gives ground-fault preference in both tripping and blocking operations but which removes the difficulties encountered in the FitzGerald type of protective system in regard to protection against ground faults. Accordingly, at each of the relaying stations A and B, there is provided a ground-fault directional relay indicated as 67 and 67', respectively. It will be understood by those skilled in the art that preferably two ground-directional relays might be utilized at each relaying station, one a highly sensitive ground-fault directional relay for blocking isolation of line section 10 on external ground faults and a less sensitive ground-fault directional relay for causing isolation of line section 10 on internal ground faults. Such an arrangement would avoid false tripping on external faults due to discrepancies in the reach of the directional relays at the two ends or stations A and B if only one ground-directional relay per station were used. However, for the sake of simplifying the drawing, a single ground-fault directional relay has been provided at each relaying station which performs the function of two separate relays as will be described hereinafter. Only the ground-fault protective arrangement at station A will be described since that at station B is identical and the same practice of designating the corresponding parts by corresponding primed reference numerals will be followed hereinafter.

Ground-directional relay 67 at relaying station A is illustrated as having a plurality of windings comprising a winding 68 connected in the residual current circuit of the current transformers having Y-connected secondary windings 50A, 50B, and 50C, respectively, and a second polarizing winding 69 energized in response to current in a circuit between a normal system neutral and ground. Such energization may be obtained in several different manners such as by providing a Y broken-delta potential transformer. However, since a grounded power transformer would often be found available at the relaying station, we propose to emphasize the possibility of eliminating the requirement of potential transformers entirely and, in the drawing, we have illustrated a power transformer 70 having a Y-connected winding 71 connected to line section 11 and a delta-connected secondary winding 72 connected to supply a suitable feeder circuit or the like 73. The Y-connected winding 71 is preferably provided with a ground connection 74 and a suitable current transformer 75 associated therewith is connected to supply winding 69 with ground polarizing current.

Ground-directional relay 67 includes a movable switching element 76 which is connected directly to the positive terminal 35 of the three-wire direct-current source. On external ground faults, switching member 76 associated with ground-directional relay 67 tends to move in a clockwise direction to engage contact 77 to complete a circuit through current-limiting resistor 78 to the screen grid 29 of the electric discharge valve 25 of transmitter T to impress a continuous positive bias thereon. With this arrangement, the transmitter T instead of transmitting carrier-frequency current during alternate half cycles of the power frequency will transmit carrier-frequency current continuously. In other words, for an external fault, ground-directional relay 67 will cause all gaps in the carrier to be filled, thereby providing ground-fault preference for blocking isolation of line section 10. Such continuous carrier will cause the receivers R and R' to operate and cause a negative bias to be imposed on the restraining grids 61 and 61', respectively, of tripping electroresponsive devices 58 and 58', respectively. It will be obvious then that, if either of the ground-directional relays 67 or 67' indicates an external ground fault, isolation of line section 10 by operation of circuit breakers 13 or 14 is prevented.

In the event of an internal ground fault with reference to line section 10, the movable switching element 76 of ground-directional relay 67 will move in a counter-clockwise direction to engage contact 79 which is connected through current-limiting resistance 80 directly to the tripping electrode 62 of tripping electroresponsive device 58, thereby placing a positive bias on electrode 62 to render electric discharge valve 58 conductive. With such a positive bias on tripping electrode 62, electric discharge valve 58 will be rendered conductive unless a continuous carrier-frequency current is received by receiver R to maintain a continuous negative bias on restraining grid 61. Accordingly, if switching member 76 of ground directional relay 67 engages contact 79, electric discharge valve 58 will be rendered conductive to cause tripping of circuit breaker 13 unless switching member 76' of ground-directional relay 67' has engaged contact 77' to indicate an external fault and to cause transmitter T' to transmit carrier-frequency current continuously.

It will be obvious to one skilled in the art that, if two separate ground-fault directional relays were provided at each relaying station, the windings 68 thereof might be connected in series and similarly the windings 69 thereof would be connected in series with reverse polarity to give opposite directional characteristics.

Although we have disclosed ground directional relay 67 with circuit closing contacts for initiating transmission of carrier current, it will be obvious from the teachings of Sporn et al. Patent 2,164,182 that circuit opening contacts might be used to increase the speed with which faults are cleared.

The operation of the protective system of our invention will be obvious to those skilled in the art in view of the detailed description included above. Whenever fault currents flow in line section 10 and the fault is external to line section 10 transmitters T or T' or both will send out currents at predetermined frequencies either as the result of the output of mixing transformers 48 and 48' or the operation of ground-directional relays 67 or 67', thereby putting a negative bias on tripping electroresponsive devices 58 and 58'. Any internal ground fault with reference to line section 10 will cause immediate tripping of circuit breakers 13 and 14 due to impressing a positive bias on the tripping grids 62 and 62' of tripping electroresponsive devices 58 and 58' during a half cycle when the receivers R and R' are not operable or when the receivers are receiving no carrier.

In the event of an out-of-step or asynchronous condition on the system including line section 10, the output of mixing transformers 48 and 48' will inherently recognize such an out-of-step condition and no false tripping will result. Similarly, a system out-of-step will have no effect on the ground-directional relays since it has no effect on the residual current so no tendency to isolate line section 10 because of operation of ground-directional relays 67 and 67' will result. Since the system oscillations will produce substantially identical currents at both ends of line section 10, the output of mixing transformers 48 and 48' will be such as to prevent any false isolation of line section 10. Furthermore, if any fault whether it be ground fault or phase fault should occur on line section 10 during an asynchronous condition, isolation of line section 10 would occur immediately and, consequently, our system provides great advantages over the prior art arrangements where complicated out-of-step blocking schemes were necessary and where faults occurring during an out-of-step condition might not be promptly cleared.

Without our proposed arrangement, although phase faults and ground faults cause somewhat different operation of the apparatus, nevertheless, there is no delay in operation of the system whether a ground fault or a phase fault occurs on the system and whether such operation be to initiate or block isolation of line section 10.

While we have shown and described our invention as applied to a particular arrangement of connections and as embodying various devices diagrammatically shown, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In a protective arrangement for a section of an electric system adapted to have an alternating current supplied thereto, a high-frequency transmitter, a receiver tuned to the frequency of said transmitter, each being connected and arranged to operate during a half cycle of a voltage derived from said circuit and to be inoperative during alternate half cycles of said derived voltage, and means responsive to a predetermined type of fault external to said section for causing said transmitter to operate during each half cycle.

2. A protective arrangement for an alternating-current circuit including means at one point of the circuit operative to transmit an oscillation of a predetermined frequency only during alternate half cycles of a voltage derived from said circuit, means at another point of the circuit operative to receive said oscillation only during alternate half cycles of a voltage derived from the circuit at said other point, circuit-controlling means arranged to be controlled by said receiving means, and means responsive to an external ground fault for causing said first-mentioned means to transmit an oscillation of a predetermined frequency during every half cycle of the voltage derived from said circuit.

3. A protective arrangement for a section of an electric circuit including circuit-interrupting means, means for controlling the circuit-interrupting means in accordance with the instantaneous directions of the currents at two points of the circuit including a high-frequency transmitter, a receiver tuned to the frequency thereof, said transmitter and receiver being connected and arranged to be operative alternately when a predetermined relation exists between the directions of the current at said points and simultaneously when a different relation exists between the directions of the current at said points, and means responsive to a ground fault outside of said section for causing said transmitter to operate continuously.

4. In a protective arrangement for a section of an electric circuit, circuit-controlling means, means for controlling said circuit-controlling means on the occurrence of abnormal circuit conditions including a plurality of transmitters connected and arranged to be controlled by the circuit current so as to transmit alternately on the occurrence of a fault on the circuit external to said section and to transmit simultaneously on the occurrence of a fault on the circuit within said section, receivers tuned to the frequency of said transmitters and controlled by the circuit current to prevent the opening of said circuit-controlling means when the transmitters are transmitting alternately, and means responsive to a ground fault external to said section to cause one of said transmitters to transmit continuously to prevent the opening of said circuit-controlling means.

5. A protective arrangement for a section of an alternating-current circuit including a high-frequency receiver means associated with each end of said section, means for controlling one of said receiver means to be operative during alternate half cycles of the alternating current flowing in the associated end of said section, means for controlling said other receiver means to be operative under normal current conditions of said section during the half cycles of said alternating current when said one receiver is inoperative, a transmitter tuned to the frequency of said receivers, and means responsive to a ground fault external to said section for causing said transmitter to transmit high-frequency oscillations during every half cycle of the alternating current of said circuit so that each of said receiver means operates in response to the oscillations from said transmitter.

6. A protective arrangement for a section of an electric circuit including means at one end of the section operative to interrupt the circuit solely in response to the circuit current at said end when in excess of a predetermined value, means responsive solely to the currents at the two ends of said section to prevent the operation of said first-mentioned means when a predetermined relationship between the circuit conditions at the ends of the section exists, and separate means responsive to a ground fault external to said section to prevent the operation of said first-mentioned means.

7. A protective arrangement for a section of an electric circuit including means at one end of the section operative to interrupt the circuit solely in response to the circuit current at said end when in excess of a predetermined value, means responsive solely to the currents at the two ends of said section to prevent the operation of said first-mentioned means when a predetermined relationship between the circuit conditions at the ends of the section exists, and separate means responsive to a ground fault on said section to permit operation of said first-mentioned means.

8. A protective arrangement for a section of an electric circuit including means at one end of the section operative to interrupt the circuit solely in response to the circuit current at said end when in excess of a predetermined value, means responsive solely to the currents at the two ends of said section to prevent the operation of said first-mentioned means when a predetermined relationship between the circuit conditions at the ends of the section exists, a pair of separate ground-fault responsive devices one associated with each end of said section, and means including one of said ground-fault responsive devices for causing operation of said first-mentioned means providing it is not prevented from such operation by the ground-fault responsive means at the other end of said section.

9. A protective arrangement for a section of an electric circuit including means at one end of the section operative to interrupt the circuit solely in response to the circuit current at said end when in excess of a predetermined value, means responsive solely to the currents at the two ends of said section to prevent the operation of said first-mentioned means when a predetermined relationship between the circuit conditions at the ends of the section exists, and a separate ground-fault directional relay responsive to a ground fault external to said section to prevent the operation of said first-mentioned means.

10. A protective arrangement for a section of an electric circuit including circuit-interrupting means at one end of said section, an electric discharge valve which upon conducting current causes operation of said circuit-interrupting means, means for controlling the conductivity of said electric discharge valve including carrier current apparatus comprising a transmitter at one end of said section and a receiver at the other end of said section, means for controlling said electric discharge valve so as to be rendered ineffective to conduct current when said receiver receives carrier current from said transmitter, and separate ground-fault responsive means for directly rendering said electric discharge valve conductive when no carrier current is received by said receiver.

11. A protective arrangement for a section of an alternating-current electric circuit including circuit-interrupting means at one end of said section, an electric discharge valve including a restraining control electrode and a tripping control electrode which upon conducting current causes operation of said circuit-interrupting means, means for controlling the conductivity of said electric discharge valve including carrier-current apparatus comprising a transmitter at one end of said section and a receiver at the other end of said section, means for energizing said restraining electrode so as to render said electric discharge valve ineffective to conduct current when said receiver receives carrier current from said transmitter, and separate ground-fault responsive means for directly rendering said electric discharge valve conductive through a predetermined energization of said tripping control electrode providing no carrier current is received by said receiver.

12. A protective arrangement for a section of an alternating-current electric circuit including circuit-interrupting means at one end of said section, an electric discharge valve which upon conducting current causes operation of said circuit-interrupting means, means for controlling the conductivity of said electric discharge valve including carrier-current apparatus comprising a high-frequency transmitter and a receiver tuned to the frequency of said transmitter, each being connected and arranged to operate during a half cycle of a voltage derived from said alternating-current circuit and to be inoperative during alternate half cycles of said derived voltage, means for rendering said electric discharge valve ineffective to conduct current when said receiver receives high-frequency current from said transmitter, and means tending to render said electric discharge valve conductive only during a small fractional part of the half cycle of said derived voltage from said alternating-current circuit when said receiver is capable of operating but fails to receive high-frequency current from said transmitter.

13. A protective arrangement for a section of an alternating-current electric circuit including circuit-interrupting means at one end of said section, an electric discharge valve which upon conducting current causes operation of said circuit-interrupting means, means for controlling the conductivity of said electric discharge valve including carrier-current apparatus comprising a high-frequency transmitter and a receiver tuned to the frequency of said transmitter, each being connected and arranged to operate during a half cycle of a voltage derived from said alternating-current circuit and to be inoperative during alternate half cycles of said derived voltage, means for rendering said electric discharge valve ineffective to conduct current when said receiver receives high-frequency current from said transmitter, and means including a peaking transformer tending to render said electric discharge valve conductive only during a small fractional part of the half cycle of said derived voltage from said alternating-current circuit when said receiver is capable of operating but fails to receive high-frequency current from said transmitter.

14. In a protective arrangement for a section of an electric system adapted to have an alternating current supplied thereto, a high-frequency transmitter, a receiver tuned to the frequency of said transmitter, each being connected and arranged to operate during a half cycle of a voltage derived from said circuit and to be operative during alternate half cycles of said derived voltage, and directional relay means responsive to a predetermined type of fault external to said section for causing said transmitter to operate during each half cycle.

15. A protective arrangement for an alternating-current circuit includng means at one point of the circuit operative to transmit an oscillation of a predetermined frequency only during alternate half cycles of a voltage derived from said circuit, means at another point of the crcuit operative to receive said oscillation only during alternate half cycles of a voltage derived from the circuit at said other point, circuit-controlling means arranged to be controlled by said receiving means, and ground-fault directional means responsive to an external fault for causing said first mentioned means to transmit an oscillation of a predetermined frequency during every half cycle of the voltage derived from said circuit.

16. In a protective arrangement for an alternating-current electrc circuit, circuit-controlling means for said circuit, carrier-current apparatus for controlling said circuit-controlling means comprising a tripping electroresponsive device, a high-frequency transmitter, and a receiver tuned to the same frequency as said transmitter, means for rendering said transmitter ineffective to transmit during alternate half cycles of a voltage derived from said alternating-current circuit, means for rendering said receiver ineffective to receive high-frequency oscillations during the alternate half cycles when said transmitter is not rendered ineffective, and means for permitting said electroresponsive device to be operated only during the alternate half cycles when said receiver is not rendered ineffective.

17. In a protective arrangement for a section of an electric system adapted to have an alternating current supplied thereto, a high-frequency transmitter, a receiver tuned to the frequency of said transmitter, each being connected and arranged to operate during a half cycle of a voltage derived from said circuit and to be operative during successive half cycles of the same polarity of said derived voltage, and additional means for causing said transmitter to operate during successive half cycles of the other polarity of said derived voltage.

18. In a protective arrangement for a section of an electric system adapted to have an alternating current supplied thereto, a high-frequency device located at one end of said section, a cooperating high-frequency device located at the other end of said section, each of said high-frequency devices being connected and arranged to operate during a half cycle of a voltage derived from said circuit and to be operative during successive half cycles of the same polarity of said derived voltage, and additional means for causing one of said high-frequency devices to operate during successive half cycles of the other polarity of said derived voltage.

19. In a protective arrangement for a section of an electric system adapted to have an alternating-current supplied thereto, a high-frequency device associated with said section, a cooperating high-frequency device tuned to the frequency of said first-mentioned high-frequency device, each of said high-frequency devices being connected and arranged to operate during a half cycle of a voltage derived from said circuit and to be operative during successive half cycles of the same polarity of said derived voltage, and additional means for causing one of said high-frequency devices to operate during successive half cycles of the other polarity of said derived voltage.

20. In a protective arrangement for a section of an electric system adapted to have an alternating current supplied thereto, high frequency transmitting means, high frequency receiving means tuned to the frequency of said transmitting means, each of said means normally being adapted to operate during a predetermined half cycle of a voltage derived from said circuit and to be inoperative during the other half cycle of said derived voltage, and means adapted to respond to a predetermined type of fault on said system for causing one of said high frequency means to be operative during each half cycle of said derived voltage.

21. In a protective arrangement for a section of an electric system adapted to have an alternating current supplied thereto, high frequency transmitting means, high frequency receiving means tuned to the frequency of said transmitting means, each of said means normally being adapted to operate during a predetermined half cycle of a voltage derived from said circuit and to be inoperative during the other half cycle of said derived voltage, and means adapted to respond to a predetermined type of fault external to said section for causing one of said high frequency means to be operative during each half cycle of said derived voltage.

22. In a protective arrangement for a section of an electric system adapted to have an alternating current supplied thereto, high frequency transmitting means, high frequency receiving means tuned to the frequency of said transmitting means, each of said means normally being adapted to operate during a predetermined half cycle of a voltage derived from said circuit and to be inoperative during the other half cycle of said derived voltage, and means adapted to respond to an external ground fault for causing one of said high frequency means to be operative during each half cycle of said derived voltage.

23. In a protective arrangement for a section of an electric system adapted to have an alternating current supplied thereto, high frequency transmitting means, high frequency receiving means tuned to the frequency of said transmitting means, means adapted to respond to a predetermined type of fault on said system for rendering each of said high frequency means operative only during a predetermined half cycle of one of the system currents, and means adapted to respond to another predetermined type of fault on said system for rendering one of said high frequency means operative during both half cycles of said system current and the other of said high frequency means operative during one of said half cycles.

24. In a protective arrangement for a section of an electric system adapted to have an alternating current supplied thereto, high frequency transmitting means, high frequency receiving means tuned to the frequency of said transmitting means, means adapted to respond to an internal fault on said section for rendering one of said high frequency means operative only during one half cycle of one of the system currents and the other high frequency means operative only during the other half cycle of said current, means adapted to respond to an external fault of a predetermined character for rendering both of said high frequency means simultaneously operative during one of said half cycles of said current, and means adapted to respond to an external fault of a different predetermined character for renderng one of said high frequency means operative during both half cycles of said current and the other of said frequency means operative during one of said half cycles.

OLIVER C. TRAVER.
GEORGE W. McKENNA.